Patented Oct. 28, 1941

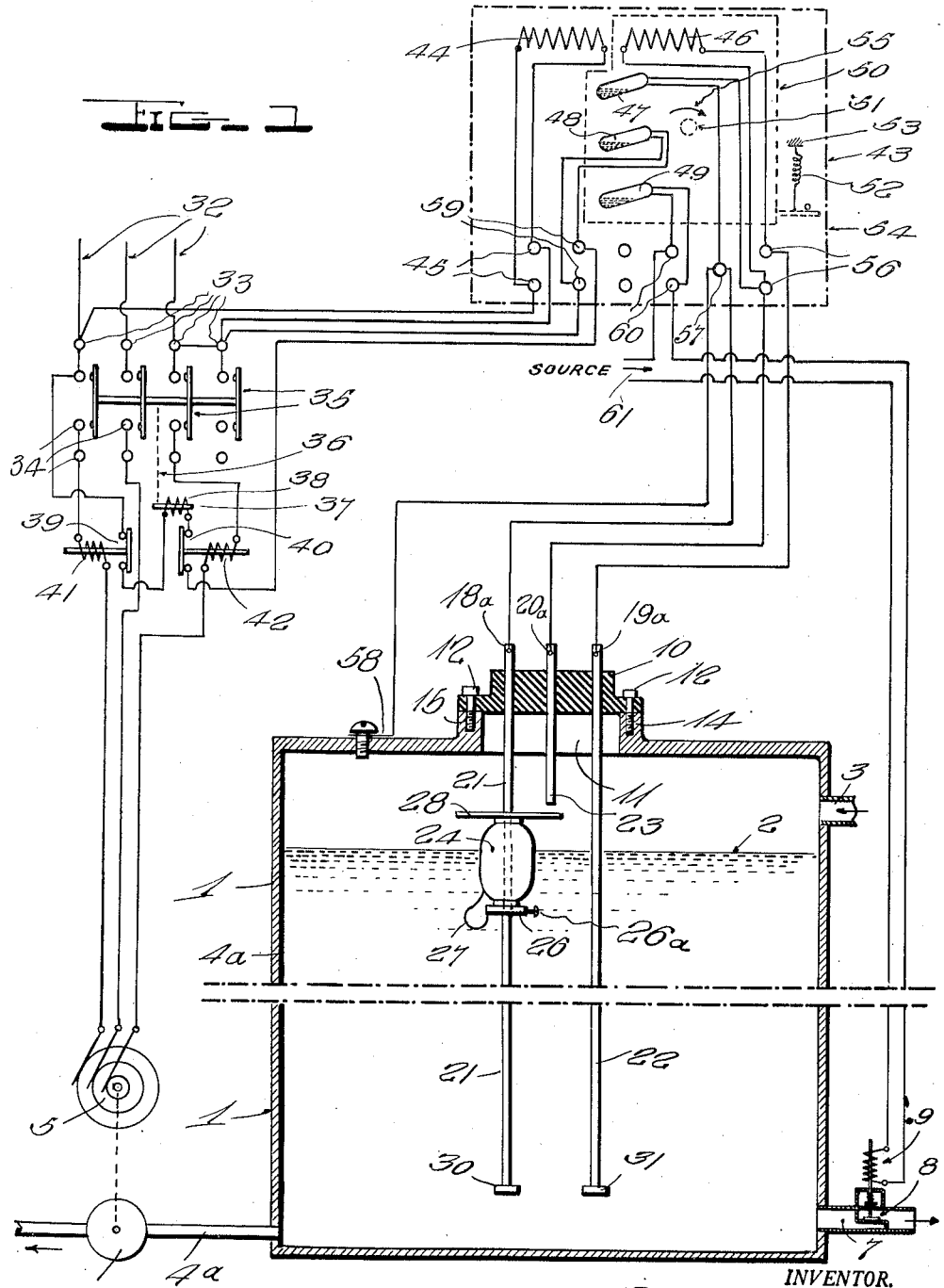

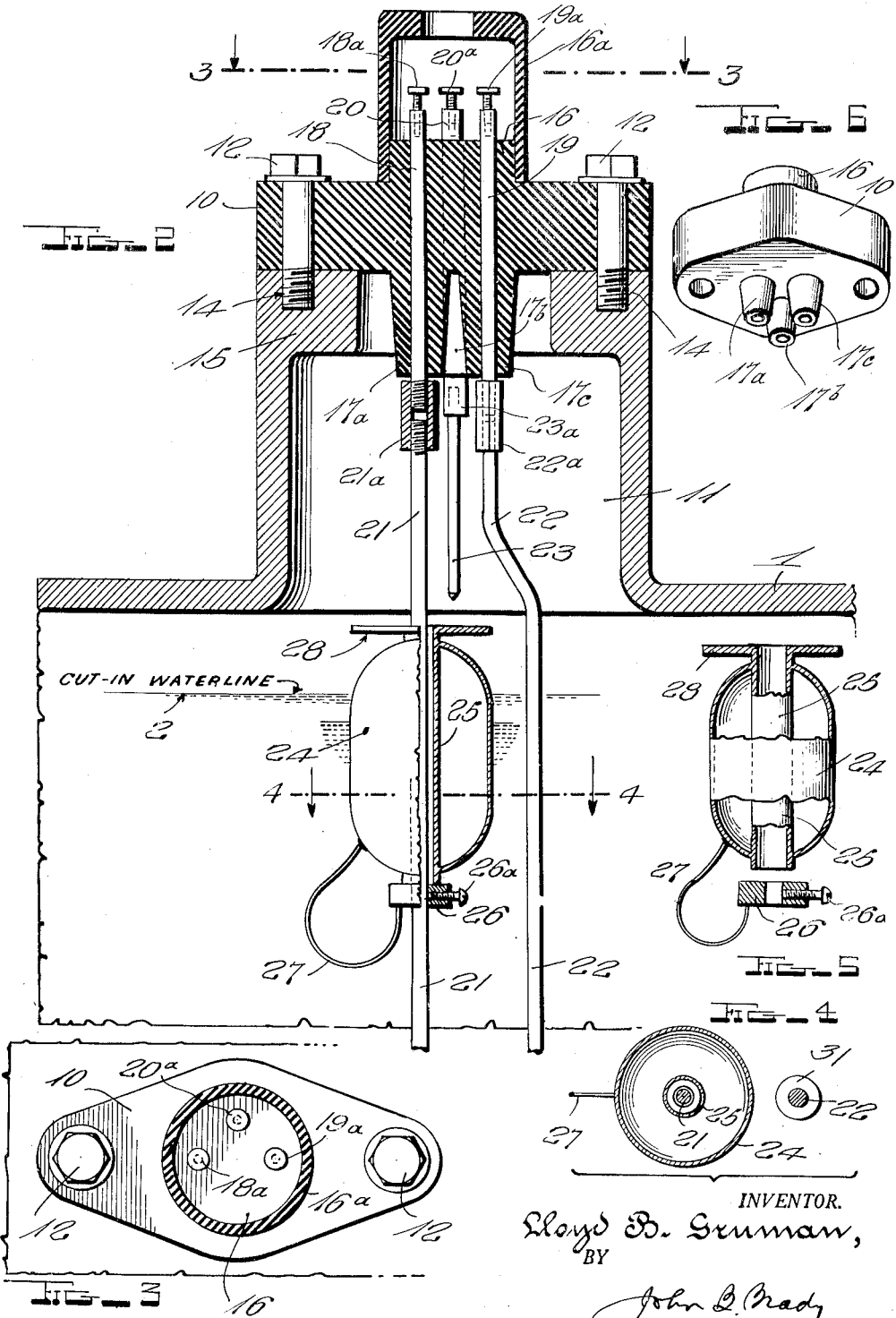

2,260,312

UNITED STATES PATENT OFFICE 2,260,312

FLOAT ACTUATED ELECTRICAL CONTROL SYSTEM

Lloyd B. Gruman, Shippensburg, Pa., assignor to Domestic Engine & Pump Company, Shippensburg, Pa., a corporation of Pennsylvania Application May 14, 1940, Serial No. 335,192

16 Claims. (Cl. 103—26)

My invention relates broadly to electrical control systems and more particularly to a float actuated electrical control system.

One of the objects of my invention is to provide an arrangement of float actuated electrical control system in which the level of fluid in a tank accurately controls the supply of fluid to the tank by use of a float actuated switch system.

Another object of my invention is to provide a float actuated control system for maintaining fluid level in a tank in which the required operating current is maintained at a minimum, the control circuit being inductively related to the power supply circuit.

Still another object of my invention is to provide a circuit arrangement for a float actuated electrical control system in which a transformer type relay is employed having a power excited primary system and an angularly shiftable secondary system operative to control a contact system and wherein the secondary system is electrically controlled by the position of a float actuated switch for controlling through the contact system, the supply of fluid to a tank within which the float operated switch is effective.

A further object of my invention is to provide a construction of electrode holder for a float actuated switch system in which combinations of electrodes projecting from an insulated carrier into a tank provide circuit elements through the tank and also guide means and contact means for a float operative to control electrical circuit means responsive to control impulses for controlling fluid level in a tank.

A still further object of my invention is to provide a construction of electrode assembly for a float actuated switch which may be mounted in a tank in which fluid level is to be controlled, the electrode assembly including a ground electrode and associated short and long electrodes in which the ground electrode also serves as a guide for a contact carrying float adapted to establish electrical connection with the short electrode in the electrode assembly when the fluid rises in the tank to a predetermined limit.

Another object of my invention is to provide a system for controlling fluid level particularly adapted for use in a sump pump, condensate or vacuum heating pump, in which an electrode assembly is employed which does not depend upon the fluid in which the electrode assembly is submerged to carry the electrical control current necessary to close the actuating circuit.

Other and further objects of my invention reside in an arrangement of electrode system for float operated circuit control systems as set forth more fully in the specification hereinafter following by reference to the accompanying drawings, in which:

Figure 1 is a diagrammatic and schematic view of the circuit arrangement of my invention and showing the electrode assembly and float switch employed in a tank system operating in accordance with my invention; Fig. 2 is an enlarged fragmentary longitudinal sectional view through the electrode assembly of my invention and showing certain of the parts in side elevation and certain of the parts broken away and illustrated partially in section; Fig. 3 is a horizontal sectional view taken on line 3—3 of the electrode assembly shown in Fig. 2; Fig. 4 is a horizontal sectional view taken on line 4—4 of Fig. 2; Fig. 5 is a detailed view of the float employed in association with the electrode assembly, parts of the float being broken away and shown in section; and Fig. 6 is a perspective view of the insulated mounting plate for supporting the electrode assembly with respect to a tank or receiver.

My invention is directed to an improved electrical control system for controlling liquid level and maintaining a substantially constant level or differential liquid level to operate a magnetic valve to control the operation of movable mechanisms and the like whereby liquid may be replenished at a predetermined level in a tank. I employ an electrode assembly and circuit arrangement in connection therewith which does not depend upon the liquid in a tank to carry the electrical current necessary to close a control circuit. In a vacuum heating system for example the condensate or water from the system carries with it grease, dirt, pipe thread compounds and rust particles which coat the inside of the receiver and electrodes to such an extent that the electrical conductivity often becomes insufficient to operate the relay in systems heretofore used. The system of my invention employs a transformer type relay having a power operated fixed primary winding and an angularly shiftable inductively related secondary winding associated with a contact system operative to control circuits to a magnetic operated valve connected to the pipe system of a receiver, tank or the like for insuring the replenishing of fluid in the receiver or tank upon operation of the float switch associated with the electrode assembly in the system of my invention. The electrode assembly comprises a mounting plate of insulating material for supporting the electrodes in the receiver or tank. The electrodes comprise a ground electrode, a short electrode and a long electrode or some multiple thereof. The ground electrode and long electrode depend downwardly from the supporting plate in a submerged position within the receiver or tank. The ground electrode and the long electrode are of the same order of length. The ground electrode serves in addition to its electrical function as a guide for the float. The float carries a contact member thereon and is positively connected through flexible connecting means with an adjustable float stop fastened to the ground electrode. The contact carried by the float is capable of making positive electrical connection with the short electrode which is located above the level of the fluid to be controlled. The purpose of having the ground electrode the same length as the long electrode, which controls the low liquid level, is to reduce to a minimum the distance between the ground and end of long electrode, as the current required for the hold-in circuit of the relay must pass through the water or liquid from the ground to the long electrode. The theory and operation of the system and structure of my invention herein described will be more fully understood by detailed reference to the drawings.

Referring to the drawings, reference character 1 indicates the receiver or tank in which the level of the fluid 2 is to be controlled. The inlet for delivering condensate to the receiver or tank is indicated at 3. Pump 4 has a pipe 4a extending into the receiver for withdrawing the condensate from the receiver 1. Pump 4 is driven by electric motor 5 for pumping fluid through pipe system 4a from receiver 1. An additional discharge from the receiver or tank 1 is indicated at 7 controlled by magnetically operated valve 8. Magnetically operated valve 8 is functioned by means of solenoid winding 9 as will be hereinafter explained. The electrode assembly of my invention is supported by insulated plate 10 which extends across aperture 11 in the receiver or tank 1 and is secured thereto as indicated more clearly in Figs. 2 and 3. Insulated plate 10 is secured in position by means of bolt members 12 which extend into screw threaded recesses 14 in the peripheral portion 15 surrounding the aperture 11 in tank or receiver 1. The insulated plate 10 has an upwardly projecting central portion 16 of insulating material and downwardly extending projecting portions 17a, 17b and 17c.

The downwardly extending projecting portions 17a, 17b and 17c serve to increase the insulation properties between the electrodes and the walls of the tank or receiver 1 as will be hereinafter more clearly explained. The insulated plate 10 provides an insulated support for connectors 18, 19 and 20 which extend beyond the upwardly projecting central portion 16 of insulated plate 10 and below the downwardly extending projecting portions 17a, 17b and 17c of insulated plate 10. The upper ends of connectors 18, 19 and 20 are provided with binding posts 18a, 19a and 20a which may be protected by a suitable cover member 16a which fits over the upwardly projecting central portion 16 of insulated plate 10 as shown. The lower ends of connectors 18 and 20 are screw threaded to provide connection means for the ground electrode 21 and the long electrode 22. This connection is effected by means of screw threaded sleeves 21a and 22a. The connector 19 extends beyond the end of the downwardly projecting portion 17 and contains a screw threaded connection which receives the short electrode 23 through sleeve 23a.

The grounding electrode 21 serves as a guide for the float indicated generally at 24. Float 24 is connected to longitudinally extending sleeve 25 that is slidable on grounding electrode 21 to a lower limit determined by adjustable float stop 26 which is adjustable in position on grounding electrode 21 by means of adjusting screw 26a for limiting the downward movement of the float 24. A flexible connection 27 extends between the float stop 26 on grounding electrode 21 and the float 24 to insure a perfect connection between ground electrode 21 and the flange 28 which extends transversely of the float 24. The flange 28 serves as an electrical contact in coaction with the short electrode 23 when the float 24 rises to cut-in position due to maximum level of fluid in the tank or receiver 1. The lower end of the grounding electrode 21 contains a headed end 30 to provide adequate electrical carrying capacity with respect to the fluid in tank 1. The long electrode 22 is provided with a headed end 31 which forms a conducting terminal for the passage of current through the water to the meter of the receiver or tank 1.

Referring more particularly to the circuit arrangement illustrated in Fig. 1, I have shown the power supply circuit leading to conductors 32 which terminate the sets of starter contacts indicated at 33 coacting with set of contacts 34 adapted to be interconnected by contact system 35 actuated through linkage 35 by solenoid 37 operative through winding 38. Circuit makers and breakers are provided at 39 and 40 controlled by solenoid windings 41 and 42, respectively, for completing circuits to driving motor 5 which operates pump 4.

I provide a very special form of circuit controller in association with the power supply system and the float controlled electrical control system of my invention as indicated generally at 43. This circuit controller consists of a transformer type relay having a fixed primary coil 44 connected to terminals 45 and electrically connected to the power supply conductors 32 through sets of contactors 33 for continuous excitation. I provide a frame member pivotally mounted adjacent fixed primary coil 44 and carrying a multiplicity of circuit controlling devices and a secondary winding 46. The secondary winding 46 is operative in the field of the fixed primary winding 44 and is capable of being attracted or repulsed thereby, for effecting movement of the pivotally mounted frame on which the movable secondary coil 46 and the circuit controllers are mounted. For purposes of explaining my invention I have indicated the circuit controllers in the form of mercury switches at 47, 48 and 49. These mercury switches are mounted on the pivotally mounted frame indicated by dotted lines 50. The pivot about which the frame 50 is adapted to be angularly rocked is schematically indicated at 51. A coil spring 52 connected to a fixed position at one end indicated at 53 and to an extension on angularly shiftable frame 50 at the other end as indicated at 54, tends to normally shift frame 50 to a position in which movable secondary coil 46 is immediately in the field of fixed primary coil 44. In this position the mercury switches 47, 48 and 49 are all open circuited and the secondary circuit leading to movable secondary coil 46 is open circuited. However, upon change in condition of the float controlled system in tank 1 and the closing of the circuit leading to secondary coil 46, magnetic repulsion between fixed primary coil 44 and movable secondary coil 46 rocks frame 50 in the direction of arrow 55 about pivot 51 closing mercury switches 47, 48 and 49. The transformer relay comprising windings 44 and 46 is self contained and as the continuously excited primary coil 44 induces an E. M. F. in the secondary coil 46, transformer action results in change in the spacial relation of movable coil 46 with respect to fixed coil 44. When the low voltage circuit is closed through secondary coil 46, magnetic repulsion moves the secondary coil 46 and closes the mercury switches 47, 48 and 49.

The movable secondary coil 46 is connected through terminals 56 to binding post 20a leading to the short electrode 23 at one side and to binding post 19a leading to the long electrode 22 at the other side in tank or receiver 1. The mercury switch 47 connects through one of the terminals 56 to binding post 20a leading to the short electrode 23, and through terminal 57 to binding post 18a leading to the grounding electrode 21 in tank or receiver 1. This mercury switch 47 also connects from terminal 57 to ground 58 on the tank or receiver 1 and serves as the low voltage hold-in circuit whereby the circuit controller 43, after being initially actuated by the float control system in tank or receiver 1, is retained in actuated position until the fluid level in tank or receiver 1 has dropped below the long electrode 22 as will be hereinafter explained.

The mercury switch 48 is connected through terminal 59 with the motor starter control circuit for starting and stopping motor 5 through solenoid control winding 38 which controls contact system 35 through link 36. The mercury switch 49 connects through terminal 60 and an external source indicated at 61 with the solenoid winding 9 of the magnetically operated valve 8. The valve 8 is normally spring pressed to closed position but is moved to open position by energization of solenoid winding 9.

When the level of the liquid reaches the level designated "cut-in water line" at 2 in Fig. 2, float 24 rises to a position in which flange 28 makes electrical contact with short electrode 23, closing the low voltage circuit through secondary winding 46 which receives the induced voltage from fixed primary coil 44 and from which the electrical circuit is completed through one terminal 56, binding post 20a, short electrode 23, flange 28, float 24, flexible connector 27, float stop 26, grounding electrode 21, headed end 30, through the fluid in tank or receiver 1 to terminal 31 and long electrode 22 returning through binding post 19a and the other terminal 56 to the opposite side of secondary coil 46, thus providing a closed electrical circuit containing the resistance of the fluid path. Under these circumstances, the field of secondary coil 46 is repelled by the field of fixed primary coil 44 which causes the frame 50 to move about pivot 51 in the direction of arrow 55 closing each of the mercury switches 47, 48 and 49. Thus motor 5 is started by the closing of mercury switch 48 operating pump 4 to pump the fluid from the tank or receiver 1. Magnetically operated valve 8 is opened allowing the fluid from tank or receiver 1 to be discharged through outlet 7. The hold-in circuit is closed through switch 47, terminal 56 and one side of secondary coil 46 and from terminal 57 to ground 58, providing a circuit through the fluid in the tank or receiver 1 to terminal 31 and long electrode 22 returning through binding post 19a to terminal 56 and the other side of secondary coil 46, thus maintaining the circuit through secondary coil 46. When the water starts to lower, the float 24 breaks its contact between flange 28 and short electrode 23 but the hold-in circuit through mercury switch 47 remains energized until the liquid reaches the end of terminal 31 on long electrode 22 and then breaks the electrical current. The hold-in circuit is thus broken and low voltage secondary winding 46 opened. There is no longer any repulsive force between secondary winding 46 and primary coil 44 so that spring 52 restores frame 50 to the position shown in Fig. 1 in which secondary coil 46 is immediately adjacent the field of primary coil 44 ready for the next succeeding control current delivered from the float controlled system. As the liquid level builds up from the bottom of the tank or receiver 1 to the terminal 31 on long electrode 22 through the delivery of condensate through inlet pipe 3 to the tank or receiver 1, there is insufficient current to close the hold-in circuit and the actuating circuit through secondary coil 46 will not be functioned until float 24 rises to a position for establishing connection between flange 28 and short electrode 23.

I have illustrated only one of many combinations which may be employed in the system of my invention. In a vacuum heating system for example the condensate or water from the system carries with it grease, dirt, pipe thread compounds and rust particles which coat the inside of the receiver and electrodes to such an extent that the electrical conductivity often becomes insufficient to operate the relay in systems heretofore used. The transformer operated relay may be provided with additional mercury switches for the control of additional functions, that is, four mercury switches may be provided, one to control the hold-in circuit, another to function one of the starters for one pump, another to function another starter for a second pump, and a further switch to function the solenoid valve.

I have found the system of my invention as set forth herein highly effective but I realize that changes may be made in the construction and arrangement of the control system of my invention and I desire that it be understood that no limitations upon my invention are intended other than may be imposed by the scope of the appended claims.

What I claim as new and desire to secure by Letters Patent of the United States is as follows:

1. An electrical circuit controller for controlling the condition of an electrical circuit according to the level of fluid in a tank comprising an insulated support adapted to be mounted transversely of an opening in the tank, a plurality of electrodes depending from said support including a grounding electrode, a long electrode and a short electrode, a float mounted for sliding movement on said grounding electrode, and a contact carried by said float and adapted to establish connection with said short electrode when the fluid level in the tank rises to a predetermined level.

2. An electrical circuit controller for controlling the condition of an electrical circuit according to the level of fluid in a tank comprising an insulated support adapted to be mounted transversely of an opening in the tank, a plurality of electrodes depending from said support including a grounding electrode, a long electrode and a short electrode, a float, a sleeve-like member connected with said float and mounted for sliding movement on said grounding electrode, and a flange member mounted adjacent the upper end of said float and adapted to establish electrical contact with said short electrode when the fluid level in the tank rises to a predetermined level.

3. An electrical circuit controller for controlling the condition of an electrical circuit according to the level of fluid in a tank comprising an insulated support adapted to be mounted transversely of an opening in the tank, a plurality of electrodes depending from said support including a grounding electrode, a long electrode and a short electrode, a float, a tubular support for said float mounted for sliding movement on said grounding electrode, a flange associated with the upper end of said float and terminating in a passage conforming with the cross sectional contour of said grounding electrode, an adjustable stop on said grounding electrode for limiting the downward movement of said float, and a flexible electrical connection between said float and said stop, said flange being operative to establish connection with said short electrode when the fluid level in the tank rises to a predetermined level.

4. An electrical circuit controller for controlling the condition of an electrical circuit according to the level of fluid in a tank comprising an insulated support adapted to be mounted transversely of an opening in the tank, a plurality of electrodes depending from said support including a grounding electrode, a long electrode and a short electrode, a float, a tubular member connected with said float and slidable with respect to said grounding electrode, a flange carried by the upper end of said tubular member, and an adjustable stop positioned on said grounding electrode for limiting the downward movement of the float, said tubular member having a bore substantially conforming with the cross sectional contour of said grounding electrode whereby said tubular member is slidable with respect to said grounding electrode, whereby the flange on said float establishes electrical connection with said short electrode when the fluid level in the tank rises to a predetermined level.

5. An electrical circuit controller for controlling the condition of an electrical circuit according to the level of fluid in a tank comprising an insulated support adapted to be mounted transversely of an opening in the tank, a plurality of connectors extending longitudinally through said insulated support and having binding posts on the upper ends thereof, means for independently coupling electrodes to the lower ends of said connectors, said electrodes comprising a grounding electrode, a long electrode and a short electrode, a float mounted for sliding movement on said grounding electrode, and a contact carried by said float and adapted to establish electrical connection with said short electrode when the fluid level in the tank rises to a predetermined level for controlling circuitous paths through said electrode.

6. An electrical circuit controller for controlling the condition of an electrical circuit according to the level of fluid in a tank comprising an insulated support adapted to be mounted transversely of an opening in the tank, said support having an upwardly extending insulated portion and a plurality of downwardly extending insulated portions, connectors individual to the plurality of downwardly extending insulated portions and projecting above the upwardly extending insulated portion of said support and providing electrical terminals, the lower end of said connectors having coupling means thereon, a set of depending electrodes connected with said coupling means, a float slidably mounted on one of said electrodes, and a contact carried by said float and movable in the path of another of said electrodes for establishing electrical contact with the last mentioned electrode when the fluid level in the tank rises to a predetermined level.

7. An electrical circuit controller for controlling the condition of an electrical circuit according to the level of fluid in a tank comprising an insulated support adapted to be mounted transversely of an opening in the tank, said support having a plurality of depending bosses thereon and a single upwardly extending boss, a connector individual to each of said depending bosses and extending above said upwardly extending boss and providing electrical terminals, a set of depending electrodes coupled to the ends of said connectors, and a float mounted for sliding movement on one of said electrodes and carrying a contact thereon adapted to establish electrical connection with another of said electrodes when the fluid level in the tank rises to a predetermined level.

8. An electrical circuit controller for controlling the condition of an electrical circuit according to the level of fluid in a tank comprising an insulated support adapted to be mounted transversely of an opening in the tank, said support having a plurality of downwardly extending tapered portions and an upwardly extending central portion, connectors individual to each of the downwardly extending portions and projecting beyond the upwardly extending portion and having electrical terminals thereon, a cover member engageable with the upwardly extending central portion and enclosing said electrical terminals, a set of depending electrodes coupled with the lower ends of said connectors, a float slidably mounted on one of said electrodes, and a contact carried by said float and adapted to establish electrical connection with another of said electrodes when the fluid level in the tank rises to a predetermined level.

9. An electrical control system comprising in combination with a tank for receiving fluid at various levels and provided with means for emptying the fluid from said tank, a set of depending electrodes mounted in spaced relation, certain of said electrodes extending into the fluid in the tank to a position adjacent the bottom of the tank, a float slidably mounted on one of the last said electrodes, an electrical contact carried by the float and operative to establish electrical connection with another of the depending electrodes of said set of electrodes, a power supply system, and a relay system operative under control of the circuit established by the contact carried by said float and one of said depending electrodes for controlling the operation of the means for emptying said tank.

10. An electrical control system comprising in combination with a tank for receiving fluid at various levels and provided with means for emptying the fluid from said tank, a set of depending electrodes mounted in spaced relation, certain of said electrodes extending into the fluid in the tank to a position adjacent the bottom of the tank, a float slidably mounted on one of the last said electrodes, an electrical contact carried by the float and operative to establish electrical connection with another of the depending electrodes of said set of electrodes, a power supply system, and a transformer type relay having a primary winding continuously excited from said power supply system and an inductively related secondary winding, a pivotally mounted frame for carrying said winding, a multiplicity of contactors controlled by the movement of said frame, spring means for normally maintaining said frame in a position in which said secondary winding is closely coupled with said primary winding, and a circuit controlled by the contact carried by said float and one of the depending electrodes for closing an electrical circuit through said movable secondary winding and effecting movement of said frame for actuating the contactors thereon for controlling the operation of the means for emptying said tank.

11. An electrical control system comprising in combination with a tank for receiving fluid at various levels and provided with means for emptying the fluid from said tank, a set of depending electrodes mounted in spaced relation, certain of said electrodes extending into the fluid in the tank to a position adjacent the bottom of the tank, a float slidably mounted on one of the last electrodes, an electrical contact carried by the float and operative to establish electrical connection with another of the depending electrodes of said set of electrodes, a power supply system, a transformer type relay including a fixed primary winding continuously excited from said power supply system, a movable frame member angularly shiftable adjacent said primary winding, a secondary winding carried by said frame member in inductive association with said primary winding, a plurality of contactors carried by said frame member, and circuits associating said secondary winding with said electrodes whereby a circuit is closed through said secondary winding when said float rises to a predetermined level for effecting movement of said frame and closing said contactors for controlling the operation of the means for emptying said tank.

12. An electrical control system comprising in combination with a power source, a transformer type relay including a fixed primary winding continuously excited by said power source and a frame member pivotally mounted adjacent the field of the primary winding, a secondary winding carried by said frame member, a plurality of contactors carried by said frame member, and spring means for normally urging said frame member to a position in which said secondary winding is closely coupled with said primary winding, a control circuit path extending from said secondary winding, controlling circuits extending from each of said contactors, and means for closing said control circuit path through a fluid resistance for effecting operation of each of said contactors and operating said controlling circuits.

13. An electrical control system comprising in combination with a power source, a transformer type relay including a fixed primary winding continuously excited by said power source and a frame member pivotally mounted adjacent the field of the primary winding, a secondary winding carried by said frame member, a plurality of contactors carried by said frame member, spring means for normally urging said frame member to a position in which said secondary winding is closely coupled with said primary winding, a control circuit path extending from said secondary winding, controlling circuits extending from each of said contactors, means for momentarily closing said control circuit path through a fluid resistance for effecting operation of each of said contactors, and means for maintaining the said operation of said contactors until said fluid resistance is reduced to substantially zero.

14. An electrical control system comprising in combination with a power source, a transformer type relay including a fixed primary winding continuously excited by said power source and a frame member pivotally mounted adjacent the field of the primary winding, a secondary winding carried by said frame member, a plurality of contactors carried by said frame member, spring means for normally urging said frame member to a position in which said secondary winding is closely coupled with said primary winding, a control circuit path extending from said secondary winding, controlling circuits extending from each of said contactors, a tank for receiving fluid at various levels, a set of electrodes including a pair of relatively long electrodes depending into the tank to a position adjacent the bottom thereof and an adjacent relatively short electrode, said set of electrodes being included in said control circuit path, a float slidably mounted on one of said pair of electrodes and adapted to establish electrical connection with said adjacent electrode when the fluid level in the tank rises to a predetermined level for closing said control circuit path through the resistance offered by the fluid in the tank, for effecting movement of said frame and said contactors to actuated position, and means for maintaining said control circuit path closed and said contactors in actuated position until the fluid level in the tank drops below the lower extremity of one of the electrodes adjacent the bottom of the tank.

15. An electrical control system comprising in combination with a power source, a transformer type relay including a fixed primary winding continuously excited by said power source and a frame member pivotally mounted adjacent the field of the primary winding, a secondary winding carried by said frame member, a plurality of sets of contactors carried by said frame member, spring means for normally urging said frame member to a position in which said secondary winding is closely coupled with said primary winding, a control circuit path extending from said secondary winding, controlling circuits extending from each of said sets of contactors, a tank for receiving fluid at various levels, a set of electrodes including a pair of relatively long electrodes depending into the tank to a position adjacent the bottom thereof and on adjacent relatively short electrode, said set of electrodes being included in said control circuit path, a float slidably mounted on one of said pair of electrodes and adapted to establish electrical connection with said adjacent electrode when the fluid level in the tank rises to a predetermined level for closing said control circuit path through the resistance offered by the fluid in the tank, effecting a repulsion of said secondary winding with respect to said primary winding and shifting said frame member for closing said sets of contactors, and means controlled by one set of said contactors for maintaining said contactors closed until the fluid level drops below the end of one of said pair of electrodes adjacent the bottom of the tank.

16. An electrical control system comprising in combination with a power source, a transformer type relay including a fixed primary winding continuously excited by said power source and a frame member pivotally mounted adjacent the field of the primary winding, a secondary winding carried by said frame member, a plurality of contactors carried by said frame member, spring means for normally urging said frame member to a position in which said secondary winding is closely coupled with said primary winding, a control circuit path extending from said secondary winding, controlling circuits extending from each of said contactors, a tank for receiving fluid at various levels, a set of electrodes including a pair of relatively long electrodes depending into the tank to a position adjacent the bottom thereof and an adjacent relatively short electrode, said set of electrodes being included in said control circuit path, a float slidably mounted on one of said pair of electrodes and adapted to establish electrical connection with said adjacent electrode when the fluid level in the tank rises to a predetermined level for closing said control circuit path through said electrodes and the resistance of the fluid path through the tank for energizing said secondary winding and effecting a repulsion with respect to said primary winding for angularly shifting said frame member and closing said contactors, one of said contactors establishing a hold-in path through the ground, the fluid path in said tank and the other of said pair of electrodes for maintaining said frame member in shifted position, and maintaining said contactors closed whereby others of said contactors may operate to effect the emptying of said tank until the fluid level drops below the extremity of one of said pair of electrodes adjacent the bottom of the tank.

LLOYD B. GRUMAN.